United States Patent
Chen

(10) Patent No.: US 11,126,045 B2
(45) Date of Patent: Sep. 21, 2021

(54) CURVED DISPLAY PANEL AND DISPLAY DEVICE

(71) Applicants: HKC Corporation Limited, Shenzhen (CN); Chongqing HKC Optoelectronics Technology Co., Ltd., Chongqing (CN)

(72) Inventor: Yu-Jen Chen, Chongqing (CN)

(73) Assignees: HKC Corporation Limited, Shenzhen (CN); Chongqing HKC Optoelectronics Technology Co., Ltd., Chongqing (CN)

( * ) Notice: Subject to any disclaimer, the term of this patent is extended or adjusted under 35 U.S.C. 154(b) by 0 days.

(21) Appl. No.: 16/625,463

(22) PCT Filed: Dec. 20, 2017

(86) PCT No.: PCT/CN2017/117350
§ 371 (c)(1),
(2) Date: Dec. 20, 2019

(87) PCT Pub. No.: WO2019/006996
PCT Pub. Date: Jan. 10, 2019

(65) Prior Publication Data
US 2020/0310207 A1    Oct. 1, 2020

(30) Foreign Application Priority Data
Jul. 6, 2017    (CN) .......................... 201710547504.9

(51) Int. Cl.
*G02F 1/1345*    (2006.01)
*G02F 1/1362*    (2006.01)

(52) U.S. Cl.
CPC .... *G02F 1/13452* (2013.01); *G02F 1/136286* (2013.01)

(58) Field of Classification Search
CPC .................... G02F 1/13452; G02F 1/136286
See application file for complete search history.

(56) References Cited

U.S. PATENT DOCUMENTS

| | | | |
|---|---|---|---|
| 2014/0217373 A1* | 8/2014 | Youn | H01L 51/5203 257/72 |
| 2016/0035978 A1* | 2/2016 | Lin | H01L 27/3244 257/88 |

(Continued)

FOREIGN PATENT DOCUMENTS

| | | |
|---|---|---|
| CN | 105144270 A | 12/2015 |
| CN | 105629599 A | 6/2016 |

(Continued)

*Primary Examiner* — Dung T Nguyen
(74) *Attorney, Agent, or Firm* — Wang Law Firm, Inc.

(57) ABSTRACT

A curved display panel and a display device. The curved display panel (400) includes a substrate; the substrate includes a pixel region, an integrated circuit region, and a fan-out region located between the pixel region and the integrated circuit region. The pixel region includes signal lines. The integrated circuit region includes an integrated circuit driver. A driving chip is provided in the integrated circuit driver. The fan-out region includes a fan-out line. The wiring parameters of the fan-out line and the signal line change along with the change of a target curvature of the substrate where the fan-out line and the signal line are located.

17 Claims, 6 Drawing Sheets

(56) References Cited

U.S. PATENT DOCUMENTS

2016/0170273 A1    6/2016  Lee et al.
2017/0265301 A1*   9/2017  Kim ..................... H05K 1/189

FOREIGN PATENT DOCUMENTS

CN     105974679 A    9/2016
CN     105974680 A    9/2016
CN     107247377 A    10/2017

* cited by examiner

CURVED DISPLAY PANEL AND DISPLAY DEVICE

CROSS-REFERENCE TO RELATED APPLICATION

This application is a National Stage Application of PCT International Patent Application No. PCT/CN2017/117350 filed on Dec. 20, 2017, under 35 U.S.C. § 371, which claims priority to and the benefit of Chinese Patent Application No. 201710547504.9, filed on Jul. 6, 2017, and the disclosure of which is incorporated herein in its entirety by reference.

BACKGROUND

1. Field

The present invention relates to the technology of electronics and especially relates to a curved display panel and a display device.

2. Description of the Related Art

The curved display is a modern, well adopted style of liquid-crystal panel due to changing desires of new viewer experience. The curved display has slowly been accepted by these viewers and continues to evolve in new directions. Since the liquid-crystal panel is a curved and not flat surface, it is typical for a conversion process to be performed to the liquid-crystal panel. The internal wiring is generally completed before the conversion process, and as a result, there is a possibility that the internal wiring may become damaged or deformed after the curved surface conversion. This presents an undesirable effect upon the finished product, particularly the most important function, the viewing effect of the display.

SUMMARY

The present invention provides a curved display panel and a display device, which ameliorates the viewing effect after the flat panel is made curved.

One aspect of the present invention provides a curved display panel. The curved display panel includes a substrate comprising a pixel region, an integrated circuit region, and a fan-out region disposed between the pixel region and the integrated circuit region, wherein the pixel region comprises signal lines, and the integrated circuit region comprises an integrated circuit driver, which is configured to receive a signal transmitted from a flexible printed circuit board. The fan-out region comprises fan-out lines, which feeds the signal to the signal lines, and trace parameters of the fan-out lines or the signal lines change according to a change of a target curvature of a location of the lines on the substrate.

In another aspect, the present invention provides another curved display panel which includes a substrate comprising a pixel region, an integrated circuit region, and a fan-out region disposed between the pixel region and the integrated circuit region, wherein the pixel region comprises signal lines, and the integrated circuit region comprises an integrated circuit driver, which is configured to receive a signal transmitted from a flexible printed circuit board, and the fan-out region comprises fan-out lines, which feeds the signal to the signal lines, and trace parameters of the fan-out lines or the signal lines are changed according to a change of a target curvature of a location of the lines on the substrate, wherein the trace parameters comprises a trace width, a trace spacing, a line thickness, and/or a length of the fan-out lines or the signal lines, and traces of data lines of the signal lines are perpendicular to a bending direction of the substrate, and the trace spacing and the trace width of the data lines is gradually and symmetrically increased from a center to two bending sides of the substrate, and traces of gate lines of the signal lines are parallel to the bending direction of the substrate, and the line thickness and the trace width of the gate lines are gradually and symmetrically increased from the center to two bending sides of the substrate.

In another further aspect, the present invention provides a curved display device including a curved display panel and a control unit, wherein the curved display panel includes a substrate including a pixel region, an integrated circuit region, and a fan-out region disposed between the pixel region and the integrated circuit region, wherein the pixel region includes signal lines, and the integrated circuit region includes an integrated circuit driver, which is configured to receive a signal transmitted from a flexible printed circuit board, and the fan-out region includes fan-out lines, which feeds the signal received by a driver chip to the signal lines, and trace parameters of the fan-out lines or the signal lines change according to a change of a target curvature of a location of the lines on the substrate.

BRIEF DESCRIPTION OF THE DRAWINGS

In order to clearly illustrate the technical solution of the embodiments of the present invention, the drawings required for the description of the embodiments will be briefly set forth as following. It is obvious that the drawings in the following description are only associated to some embodiments of the present invention. One ordinarily skilled in the art may obtain other drawings according to these drawings without making any inventive effort.

DESCRIPTION OF THE PREFERRED EMBODIMENTS

Accompanying the drawings in the embodiments of the present invention, the technical solutions in the embodiments of the present invention will be clearly and completely described below. Instead of being all embodiments, the described embodiments are apparently only some of the embodiments of the present invention. Based on the embodiments of the present invention, all other embodiments, which are derived by persons with ordinary skill in the art without making a creative effort, shall fall within the protection scope of the present invention.

It should be understood that, when used in the present specification and appended claims, the terms "comprise" and "include" indicate the presence of the described features, integration, steps, operations, elements, and/or components but do not preclude the presence of additional one or more other features, integrations, steps, operations, elements, components, and/or groups.

It should also be understood that the terminology used in the specification of the present invention is solely for the purpose of describing particular embodiments and is not intended to limit the present invention. As used in this specification and the appended claims, the singular forms "a", "an", and "the" are intended to include the plural forms unless the context clearly indicates otherwise.

Figure 1:
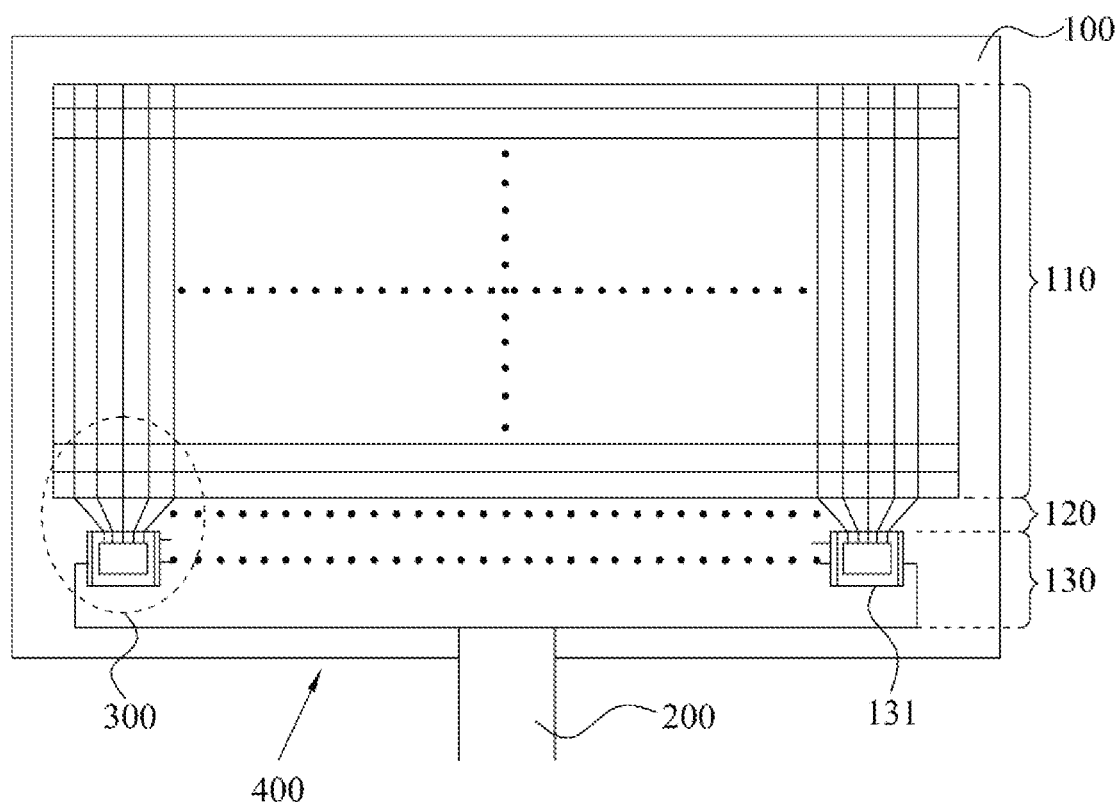
FIG. 1 is a schematic plan view showing a curved display panel provided in an embodiment of the present invention.
Figure 2:
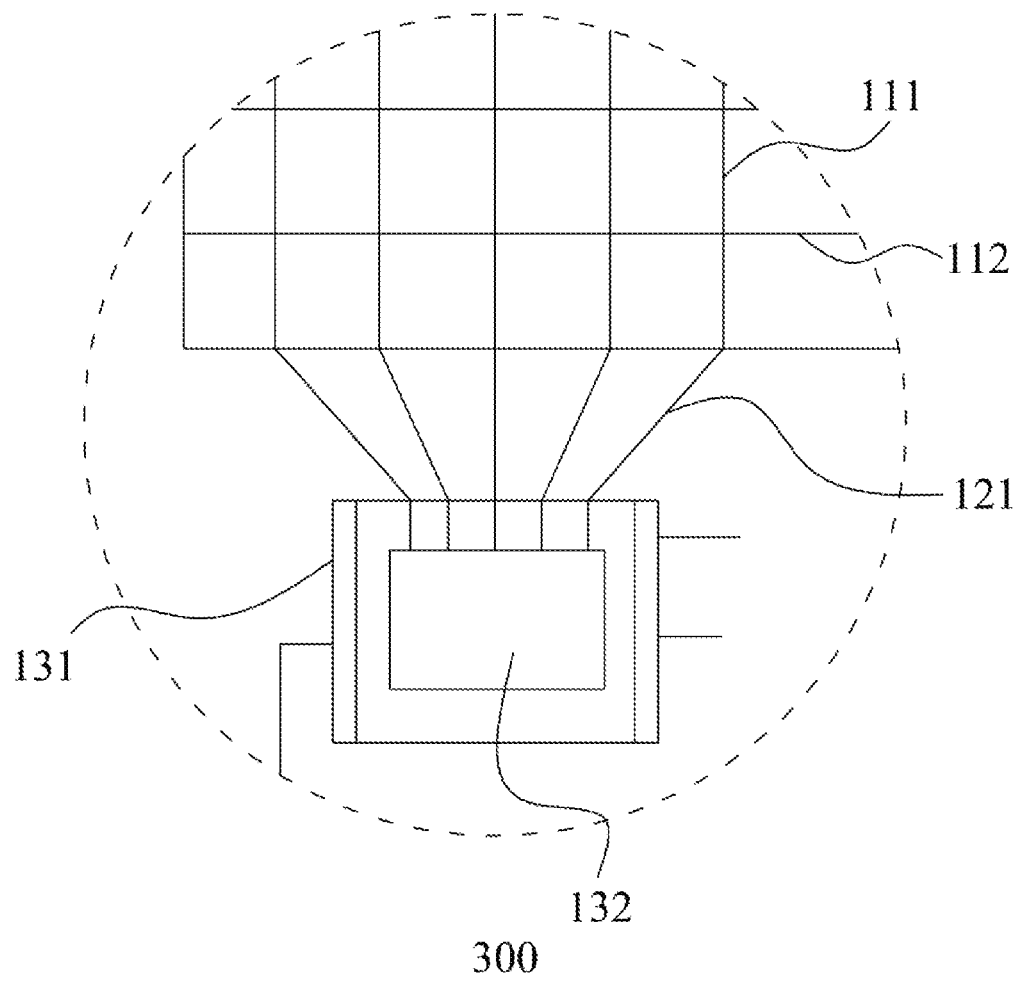
FIG. 2 is a partial enlarged view showing a curved display panel provided in an embodiment of the present invention.

As shown in FIGS. 1 and 2, the present invention provides a curved display panel 400 including a substrate 100, which includes a pixel region 110, an integrated circuit region 130, and a fan-out region 120 located between the pixel region 110 and the integrated circuit region 130. Wherein, the pixel region 110 includes signal lines such as a data line 111 and a gate line 112. The integrated circuit region 130 includes an integrated circuit driver 131, and the integrated circuit 131 includes a driver chip 132 for receiving a signal transmitted from a flexible printed circuit board 200. The fan-out region 120 includes a fan-out line 121 for feeding the signal received by the driver chip 132 to the data line 111. The trace parameters of the fan-out line 121, the data line 111, or the gate line 112 vary according to the difference of the target curvature at the location where the line is located on the substrate 100.

In a specific embodiment, the display panel 400 is, for example, a liquid-crystal panel, which includes the substrate 100. The substrate 100 includes divisions of the pixel region 110, the integrated circuit region 130, and the fan-out region 120 located between the pixel region 110 and the integrated circuit region 130. The pixel region 110 includes signal lines such as the data line 111 and the gate line 112. The integrated circuit region 130 includes the integrated circuit driver 131, and the integrated circuit 131 includes the driver chip 132 for receiving a signal transmitted from the flexible printed circuit board 200. The fan-out region 120 includes the fan-out line 121 for feeding the signal received by the driver chip 132 to the data line 111. After the image display signal is transmitted through the flexible printed circuit board 200 to the integrated circuit region 130, the integrated circuit region 130 dispatches the image display signal to each one of the integrated circuit drivers 131. The signal is then sent to the pixel region 110 through the fan-out lines 121, which are in the fan-out region 120 and radially connected to the integrated circuit driver 131. Each one of independent pixel units, which are divided by the signal lines (such as gate lines 112 and data lines 111), independently responses the image signal to fulfill the purpose of displaying an image.

In the meanwhile, the trace parameters of the signal lines (such as the fan-out line 121 or the data line 111) or the gate line 112 vary according to the difference of the target curvature at the location where the line locates on the substrate 100.

Specifically, the trace parameters include trace width, trace spacing, thickness, and/or length of the fan-out line 121, the data line 111, or the gate line 112. Because the curved display panel is obtained by bending a pre-made flat display panel including the traces in the panel is already set up, the inner traces are easily deformed by an external force after the bending procedure. After the formation of the curvature, the trace spacing between adjacent data lines 111 that are in different direction from the bending direction is reduced. In order for the data lines 111 to reach the target trace spacing, it is necessary to increase the trace spacing of adjacent data lines 111 when the panel is in the non-curved, flat state. In the meanwhile, because of different curvature on the bending surface, the trace width of the data lines 111 also needs to be compensated in advance to effectively achieve the target trace width. The gate line 112 is typically parallel to the bending direction of the panel and is deformed under the panel bending stress. The cross-sectional area of the gate line 112 is therefore changed on the basis of the former gate line 112 before the formation of the curvature to counteract the effect of local stress. Different cross-sectional areas or different trace widths and thicknesses are assigned for different curvatures. An end of the fan-out line 121 connects the integrated circuit driver 131 and the other end connects the data line 111; when the trace parameters of the data line 111 are changed, the trace parameters of the fan-out line are also accordingly modified.

Furthermore, the trace of the data line 111 is perpendicular to the bending direction of the substrate 100, and the trace spacing and trace width of the data lines 111 are gradually and symmetrically increased from the center to the two short sides of the substrate 100.

Specifically, the trace of the data line 111 is perpendicular to the bending direction of the substrate 100. For example, as for the curved display substrate 100 bending inward on a horizontal surface, each one of the data lines 111 is a signal line perpendicular to horizontal surface, and the data lines 111 are parallel to one another, and the trace spacing is equal. If the setup of the trace spacing of the data lines 111 is equal when the substrate 100 is flat, a viewer in front the substrate 100 will see that the trace spacing of adjacent data lines 111 decreases as the curvature of the two sides of the substrate 100 increases after the substrate 100 is bent. It is because, when the substrate 100 is bent, the projection of the trace spacing of the data lines 111 on the plane which the flat substrate 100 was on is smaller than the real trace spacing projection. As the curvature the bending of the substrate 100 and the tilted viewing angle increase, the trace width of the data line 111 becomes narrower because of the effect of the stress in the substrate 100. Therefore, in order to achieve a target trace spacing and trace widths when the substrate 100 is curved, the trace spacing and the trace widths of the data lines 111 have to be compensated when the substrate 100 is in the flat state, by gradually and symmetrically increasing the trace spacing and the trace widths from the center to two bending sides of the substrate 100, wherein the amount of the increase is determined by the curvature of the location where they located on the substrate 100. (This is for the condition that the curvature is symmetrically increased from the center to both sides of the substrate 100. If the curvature is not increased to both sides of the substrate 100 symmetrically after the bending, the compensation should be modified based on the change of the real curvature on the actual substrate 100).

Furthermore, the direction of the trace of the gate line 112 is parallel to the arc defined by the bending direction of the substrate 100, and the line thickness and the trace width of the gate line 112 are gradually increased from the center to both bending sides of the substrate 100.

Specifically, the trace of the gate line 112 is parallel to the bending direction of the substrate 100. For example, as for the substrate 100 of the curved display bending outward from horizontal surface, each one of the gate lines 112 is initially a trace parallel to horizontal surface, and the gate lines 112 are parallel to one and another with equal trace spacing. After the bending of the substrate 100, the gate line 112 is deformed under the bending stress of the substrate 100, and the trace width and trace thicknesses become smaller as the stress increases, wherein the position on the substrate with a higher curvature has a greater inner stress. Therefore, in order to achieve a target size of the trace thickness and trace width of the gate line 112, it is necessary to compensate for the trace thickness and trace width of the gate line 112 when the substrate 100 is in its curved state, that is to symmetrically increase the trace spacing and the trace width of the gate line 112 from the center gradually to both sides of the substrate 100 for the gate line 112 at all position with sufficient trace spacing and trace width to counteract the bending stress of the substrate 100, so that the trace parameters of the gate line 112 can achieve target values after the bending of the substrate 100 (this is for the condition that the curvature symmetrically increases from the center to both sides of the substrate 100. If the curvature of the substrate 100 does not symmetrically increase to both sides after the bending, the compensation should be based on the change of the real curvature of the actual substrate 100).

Furthermore, the fan-out line 121 and the data line 111 are electrically connected, so that the trace width, the trace spacing, and the length of the fan-out line 121 are changed according to the alternation of the data line 111.

Specifically, the fan-out line 121 and the data line 111 are electrically connected, and their traces are interconnected, so that the trace width, the trace spacing, and the length of the fan-out line 121 are changed according to the alternation of the data line 111. For example, in the aforementioned embodiment, the curvature of the substrate 100 increases from the center to two bending sides of the substrate 100, and the trace width and the trace spacing of the data lines 111 are increased from the center to the two sides of the substrate 100, so that the fan-out line 121 that is intended to connect the data line 111 has to symmetrically increase its trace width and trace spacing. In the meanwhile, because the trace spacing of the fan-out line 121 has been changed, the length of the fan-out line 121 has to be changed accordingly. The trace spacing of the fan-out line 121 is increased, so the length of the fan-out line 121 is also accordingly increased.

Figure 3:
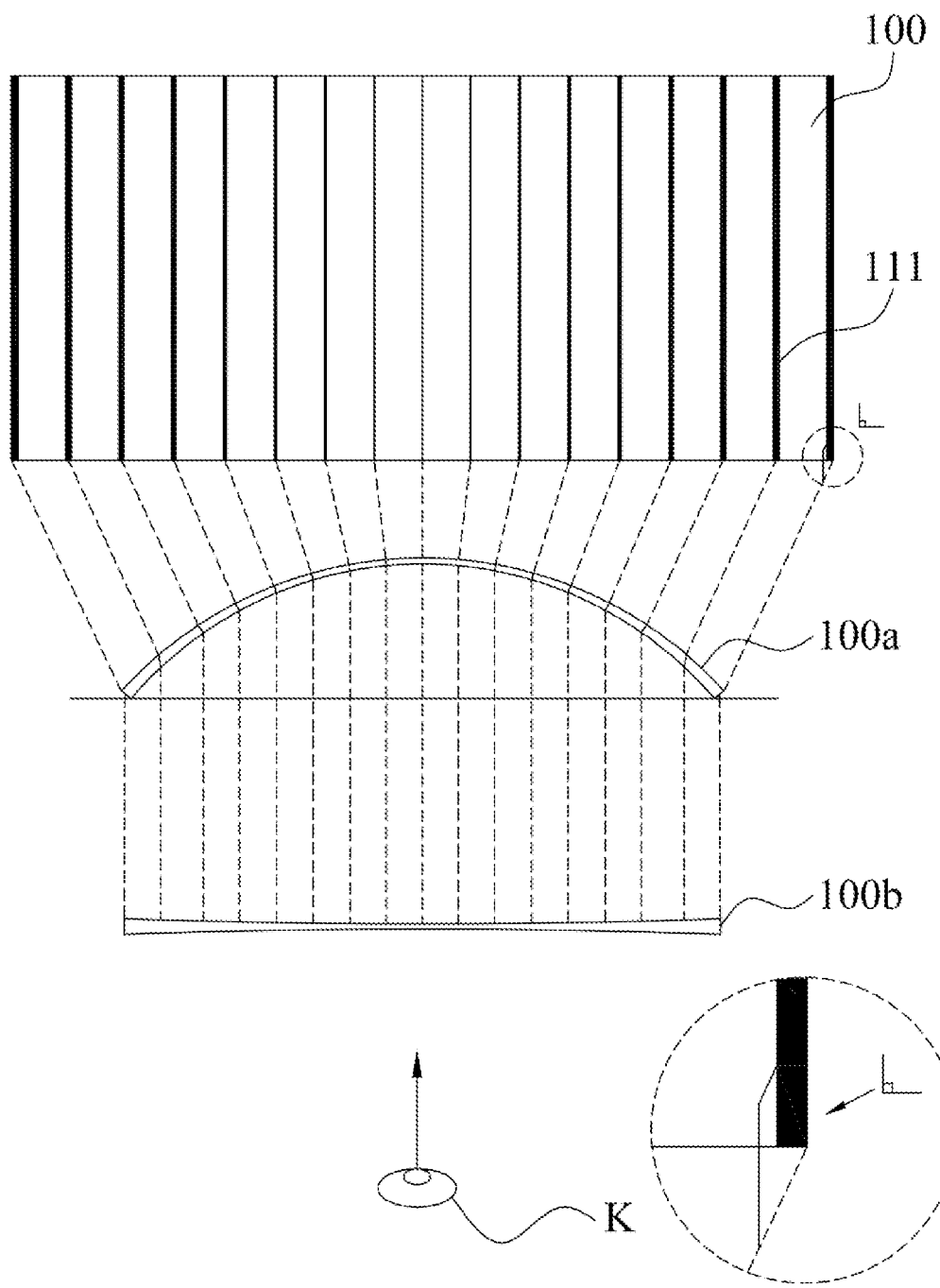
FIG. 3 is a schematic diagram showing a curved display panel provided in an embodiment of the present invention.

As specifically shown in FIG. 3, on the flat substrate 100 before the bending, the trace spacing of the data lines 111 is gradually increased from the center to two sides, and the trace width is also accordingly increased (not shown in FIG. 3). The curved substrate 100a including curvy plane sections is then formed after the flat substrate 100 undergoes the bending process. What a human eye K can see, when directed toward the curved substrate 100a, is an image substrate 100b, and the trace parameters of the data line 111 in the image substrate 100b are the target trace parameters. For the same reason, the thickness of the gate line 112 (not shown in FIG. 3) gradually and symmetrically increases from the center to two bending sides of the substrate 100 when the substrate 100 is flat to counteract the gradual increase of the inner stress from the center to two bending sides when the substrate is bent. It is to ensure that the gate line 112 will not become deformed. The fan-out lines 121 (not shown in FIG. 3) electrically connect the data lines 111, and the trace widths, the trace spacings, and the lengths of the fan-out lines 121 are changed according to the alternations of the data lines 111.

Figure 4:
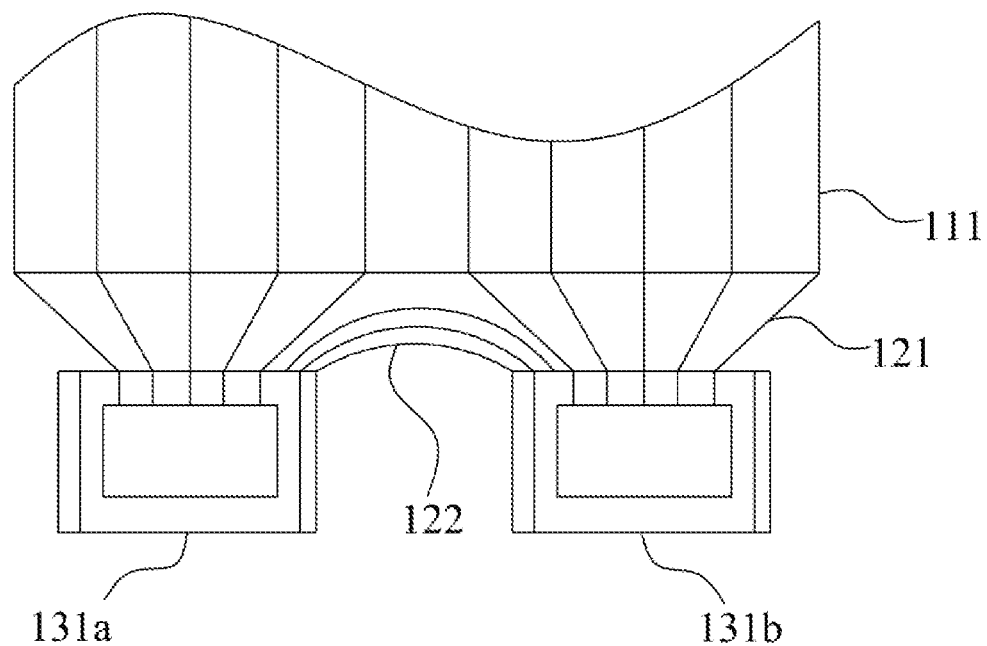
FIG. 4 is a partial schematic diagram showing a curved display panel provided in an embodiment of the present invention.

The following refers to FIG. 4. Moreover, the arcuate driving line 122 that connects adjacent driver chips 132 is curvedly disposed in the fan-out region 120.

Specifically, the driving line 122 that is configured to be arcuate and disposed in the fan-out region 120 can reduce trace compression between two adjacent integrated circuit drivers 131a and 131b. Since there are other traces besides the driving line 122, the increased trace spacing of the traces between the integrated circuit drivers 131a and 131b can avoid the occurrence of the overheating because of crowded traces, thereby improving safety and security of the device.

Furthermore, the thickness of the substrate 100 gradually increases from the center to the two bending sides of the substrate 100.

Specifically, when the substrate 100 is made curved, the inner stress increases from the center to both bending sides of the substrate 100. By increasing the thickness of the substrate 100 which has large inner stress to resist the inner stress of the bent substrate 100, the performance of the substrate 100 is therefore improved.

Figure 5:
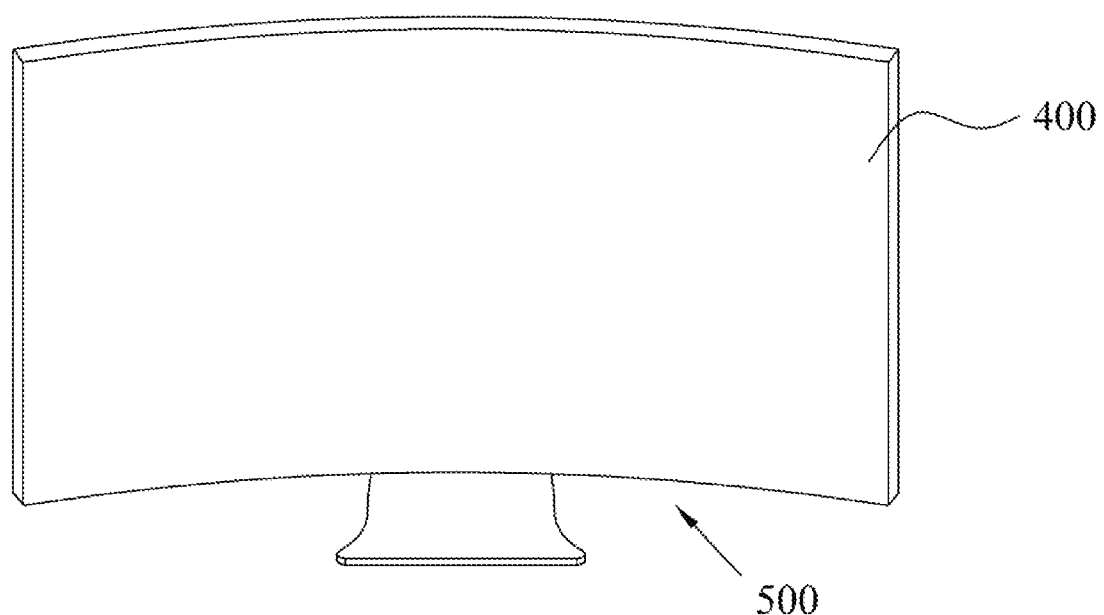
FIG. 5 is a schematic diagram showing a display device provided in an embodiment of the present invention.
Figure 6:
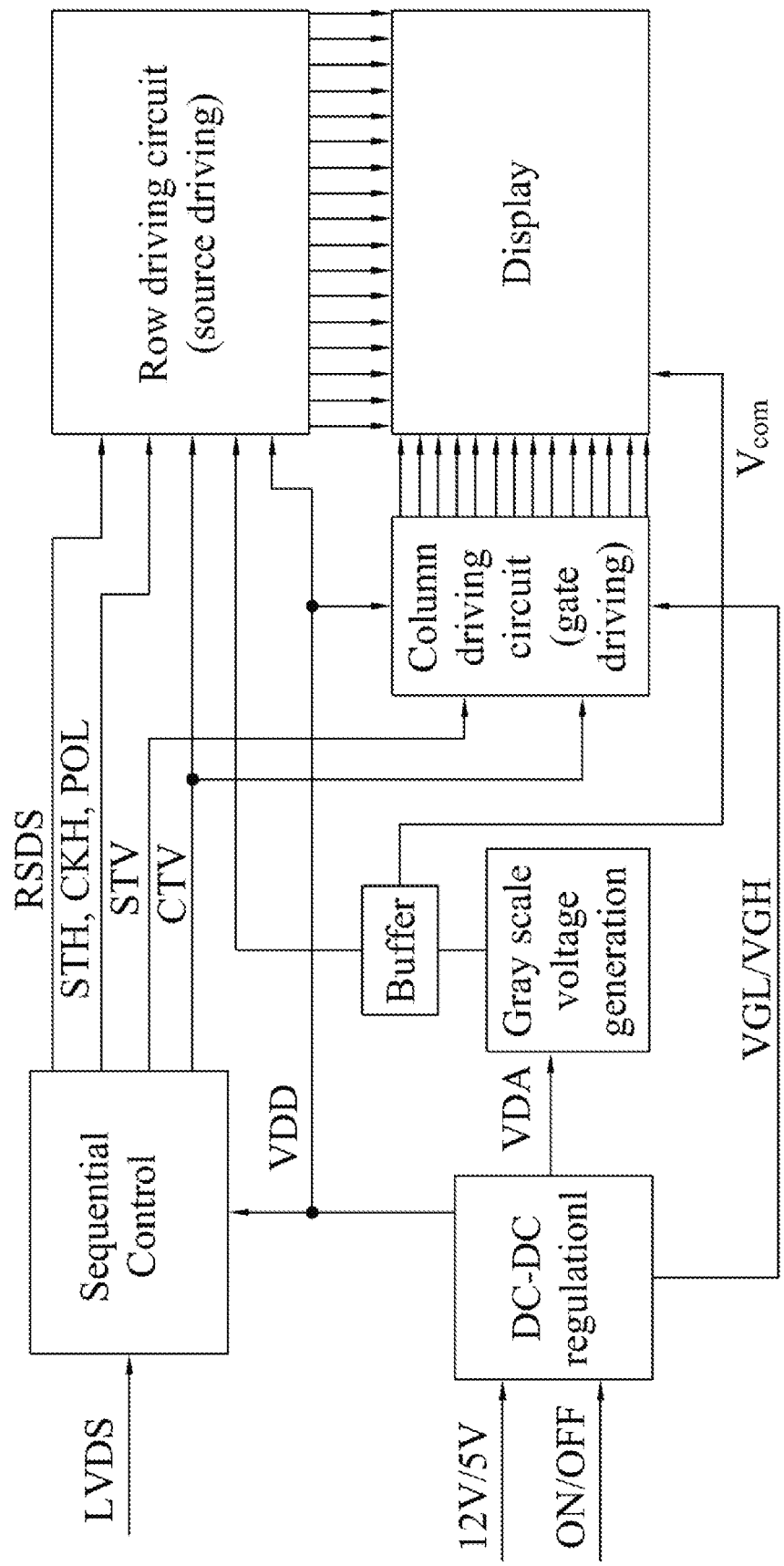
FIG. 6 is a diagram showing a control unit module of a display device provided in an embodiment of the present invention.

The following refers to FIG. 5, which shows a display device 500 provided in an embodiment of the present invention, wherein the display device 500 includes the aforementioned curved display panel 400 and a control unit (as shown in FIG. 6) that controls the curved display device. As shown in FIGS. 1 and 2, the curved display panel 400 includes the substrate 100, which includes the pixel region 110, the integrated circuit region 130, and the fan-out region 120 located between the pixel region 110 and the integrated circuit region 130. Wherein, the pixel region 110 includes the data line 111 and the gate line 112. The integrated circuit region 130 includes the integrated circuit driver 131, and the integrated circuit 131 includes the driver chip 132 disposed within for receiving a signal transmitted from the flexible printed circuit board 200. The fan-out region 120 includes the fan-out line 121 for feeding the signal received by the driver chip 132 to the data line 111. The trace parameters of the fan-out line 121, the data line 111, or the gate line 112 vary according to the difference of the target curvature at the location where the line is located on the substrate 100.

In some embodiments, the curved display panel 400 can be, for example, a twisted nematic liquid-crystal display panel, an in-plane-switching liquid-crystal display panel or a multi-domain vertical alignment liquid-crystal display panel, an OLED display panel, or a QLED display panel.

Furthermore, the trace of the data line 111 is perpendicular to the bending direction of the substrate 100, the trace spacing and the trace widths of the data lines 111 are gradually and symmetrically increased from the center to the two bending sides of the substrate 100. The trace of the gate line 112 is parallel to the bending direction of the substrate 100, and the thickness of the gate line 112 is gradually and symmetrically increased from the center to the two bending sides of the substrate 100. For the fan-out lines 121 electrically connecting the data lines 111, the trace width, the trace spacing, and length of the fan-out line 121 are changed according to the alternation of the data line 111.

As specifically shown in FIG. 3, on the flat substrate 100 before the bending, the trace spacing of the data lines 111 are gradually increased from the center to two sides, and the trace widths are also accordingly increased (not shown in FIG. 3). The curved substrate 100a including curvy plane sections is then formed after the bending. What a human eye K can see, when directed towards the curved substrate 100a, is an image substrate 100b, and the trace parameters of the data line 111 in the image substrate 100b are the target trace parameters. For the same reason, the thickness of the gate line 112 (not shown in FIG. 3) is gradually and symmetrically increased from the center to the two bending sides of the substrate 100 when the substrate 100 is flat to counteract the gradual increase of the inner stress from the center to the two bending sides when the substrate is bent. It is to ensure that the gate line 112 is not deformed. The fan-out lines 121 (not shown in FIG. 3) electrically connect the data lines 111, and the trace widths, the trace spacings, and the lengths of the fan-out lines 121 are changed according to the alternations of the data lines 111.

The following refers to FIG. 4. Moreover, the arcuate driving line 122 that connects adjacent driver chips 132 is curvedly disposed in the fan-out region 120.

Specifically, the driving line 122 that is configured to be arcuate and disposed in the fan-out region 120 can reduce trace compression between two adjacent integrated circuit drivers 131a and 131b. Since there are other traces except the driving line 122, the increased trace spacings of the traces between the integrated circuit drivers 131a and 131b can avoid the occurrence of the overheating because of crowded traces, improving safety and security of the device.

Furthermore, the thickness of the substrate 100 is gradually increased from the center to the two bending sides of the substrate 100.

Specifically, when the substrate 100 is made curved, the inner stress increases from the center to both bending sides of the substrate 100. By increasing the thickness of the substrate 100 where has large inner stress to resist the inner stress of the bent substrate 100, the performance of the substrate 100 is therefore improved.

The following refers to FIG. 6, which is a module diagram of the control unit of the display device provided in the embodiment of the present invention. The control unit includes a sequential control circuit module, a gray scale voltage generating circuit module, a DC-DC voltage regulation module, a display source driving circuit module, and a display gate driving module. An LVDS (Low-Voltage Differential Signaling technical interface) standard image signal that is sent from a front-end video signal processing circuit is converted to an RSDS (reduced-swing differential signaling) standard image signal necessary for the display peripheral source driving and gate driving circuits by the sequential control circuit module. In the meanwhile, the sequential control circuit module outputs the drive control signals necessary for the working of the source driving and gate driving circuits (STV as a pulse signal for being shifted by a shift register of the gate driving circuit, CKV as a pulse signal for being triggered by the shift register of the gate driving circuit, STH as an initial pulse signal for being shifted by a shift register of the source driving circuit, CKH as a pulse signal for being triggered by the shift register of the source driving circuit, and POL as a control signal to inverse the polarities of source pixel signals line by line). These signals are fed to the driver circuits in the periphery of the display to accomplish the showing of an image on the display.

The logic driver circuit of the liquid-crystal display is an independent system, the workings of which requires various power supplies such as a VDD (digital power) power supply, a gate drive power supply VGH (positive power supply input pin) and VGL (negative power supply input pin), a gamma reference voltage of VGA (video graphics array), etc. To ensure the stability of the working system, a specific switching power supply circuit is configured to generate the VDD, VGA, VGH, and VGL voltages required by logic driving circuits through converting the incoming 5V/12V voltage via the DC-DC voltage regulation circuit.

It should be understood that, in the embodiments provided in the present application, the disclosed contents are only illustrative and can be achieved by other means.

The aforementioned description is merely specific embodiments of the present invention, and the present invention is not limited to the description. Any modification or replacement which can be easily figured out by a person skilled in the art based on the technology disclosed within the present invention shall fall within the protection scope of the present invention. Therefore, the protection scope of the present invention shall be subject to the protection scope of the claims.

What is claimed is:

1. A curved display panel, comprising:
a substrate comprising a pixel region, an integrated circuit region, and a fan-out region disposed between the pixel region and the integrated circuit region, wherein the pixel region comprises signal lines, and the integrated circuit region comprises an integrated circuit driver, which is configured to receive signals transmitted from a flexible printed circuit board, and the fan-out region comprises fan-out lines, which feed the signal to the signal lines, and trace parameters of the fan-out lines or the signal lines are changed according to a change of a target curvature of a location of the lines on the substrate;
wherein the change of the trace parameters of the signal lines according to the change of the target curvature of the location of the lines on the substrate comprises that traces of data lines of the signal lines are perpendicular to a bending direction of the substrate, and a trace spacing and a trace width of the data lines are gradually and symmetrically increased from the center of the substrate to two bending sides of the substrate.

2. The curved display panel of claim 1, wherein the trace parameters comprise the trace width, the trace spacing, a line thickness, and/or a length of the fan-out lines or the signal lines.

3. The curved display panel of claim 2, wherein the change of the trace parameters according to the change of the target curvature of the location of the lines on the substrate comprises that traces of gate lines of the signal lines are parallel to the arc defined by the bending direction of the substrate, and the line thickness and the trace width of the gate lines are gradually and symmetrically increased from the center of the substrate to two bending sides of the substrate.

4. The curved display panel of claim 1, wherein the change of the trace parameters of the fan-out lines according to the change of the target curvature of the location of the lines on the substrate comprises, for the fan-out lines electrically connecting the data lines, the trace width, the trace spacing, and the length of the fan-out lines are changed according to the change of the data lines.

5. The curved display panel of claim 1, wherein the panel further comprises:
a driving line, which is configured to electrically connect the adjacent integrated circuit drivers and is arcuate and curvedly disposed in the fan-out region.

6. A curved display panel, comprising:
a substrate comprising a pixel region, an integrated circuit region, and a fan-out region disposed between the pixel region and the integrated circuit region, wherein the pixel region comprises signal lines, and the integrated circuit region comprises an integrated circuit driver, which is configured to receive signals transmitted from a flexible printed circuit board, and the fan-out region comprises fan-out lines, which feed the signals to the signal lines, and trace parameters of the fan-out lines or the signal lines are changed according to a change of a target curvature of a location of the lines on the substrate; wherein the trace parameters comprises a trace width, a trace spacing, a line thickness, and/or a length of the fan-out lines or the signal lines, and traces of data lines of the signal lines are perpendicular to a bending direction of the substrate, and the trace spacing and the trace width of the data lines are gradually and symmetrically increased from a center to two bending sides of the substrate, and traces of gate lines of the signal lines are parallel to the arc defined by the bending direction of the substrate, and the line thickness and the trace width of the gate lines are gradually and symmetrically increased from the center to two bending sides of the substrate.

7. The curved display panel of claim 6, wherein the change of the trace parameters of the fan-out lines according to the change of the target curvature of the location of the lines on the substrate comprises, for the fan-out lines electrically connecting the data lines, the trace width, the trace spacing, and the length of the fan-out lines are changed according to the change of the data lines.

8. The curved display panel of claim 6, further comprising:
a driving line configured to electrically connect the adjacent integrated circuit drivers and is arcuate and curvedly disposed in the fan-out region.

9. The curved display panel of claim 6, wherein a thickness of the substrate is gradually and symmetrically increased from the center to two bending sides of the substrate.

10. The curved display panel of claim 6, wherein for the fan-out lines electrically connecting the data lines, the trace width, the trace spacing, and the length of the fan-out lines are changed according to the change of the data lines, and a thickness of the substrate is gradually and symmetrically increased from the center to two bending sides of the substrate.

11. A display device, comprising:
a control unit;
a curved display panel, wherein the curved display panel comprises a substrate comprising a pixel region, an integrated circuit region, and a fan-out region disposed between the pixel region and the integrated circuit region, wherein the pixel region comprises signal lines, and the integrated circuit region comprises an integrated circuit driver, which is configured to receive a signal transmitted from a flexible printed circuit board, and the fan-out region comprises fan-out lines, which feeds the signal received by a driver chip to the signal lines, and trace parameters of the fan-out lines or the signal lines change according to a change of a target curvature of a location of the lines on the substrate;

wherein the change of the trace parameters of the signal lines according to the change of the target curvature of the location of the lines on the substrate comprises that traces of data lines of the signal lines are perpendicular to a bending direction of the substrate, and a trace spacing and a trace width of the data lines are gradually and symmetrically increased from a center to the two bending sides of the substrate.

12. The display device of claim 11, wherein the trace parameters comprise the trace width, the trace spacing, a line thickness, and/or a length of the fan-out lines or the signal lines.

13. The display device of claim 12, wherein the change of the trace parameters of the signal lines according to the change of the target curvature of the location of the lines on the substrate comprises that traces of gate lines of the signal lines are parallel to the arc defined by the bending direction of the substrate, and the line thickness and the trace width of the gate lines are gradually and symmetrically increased from a center to the two bending sides of the substrate.

14. The display device of claim 12, wherein the change of the trace parameters of the signal lines according to the change of the target curvature of the location of the lines on the substrate comprises that traces of data lines of the signal lines are perpendicular to a bending direction of the substrate, and the trace spacing and the trace width of the data lines are gradually and symmetrically increased from a center to two bending sides of the substrate, and traces of gate lines of the signal lines are parallel to the arc defined by the bending direction of the substrate, and the line thickness and the trace width of the gate lines are gradually and symmetrically increased from a center to two bending sides of the substrate.

15. The display device of claim 11, wherein the change of the trace parameters of the fan-out lines according to the change of the target curvature of the location of the lines on the substrate comprises, for the fan-out lines electrically connecting the data lines, the trace width, the trace spacing, and the length of the fan-out lines are changed according to the change of the data line.

16. The display device of claim 11, wherein the panel further comprises:
a driving line, which is configured to electrically connect the adjacent integrated circuit drivers and is arcuate and curvedly disposed in the fan-out region.

17. The display device of claim 11, wherein a thickness of the substrate is gradually and symmetrically increased from a center to two bending sides of the substrate.

* * * * *